(12) United States Patent
Tsuda et al.

(10) Patent No.: US 9,653,711 B2
(45) Date of Patent: May 16, 2017

(54) FLAT BATTERY

(71) Applicant: HITACHI MAXELL, LTD., Ibaraki-shi, Osaka (JP)

(72) Inventors: Kenji Tsuda, Ibaraki (JP); Noriyuki Yabushita, Ibaraki (JP); Koji Yamaguchi, Ibaraki (JP); Atsushi Yamano, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 16 days.

(21) Appl. No.: 14/407,277

(22) PCT Filed: Jun. 13, 2013

(86) PCT No.: PCT/JP2013/066356
§ 371 (c)(1),
(2) Date: Dec. 11, 2014

(87) PCT Pub. No.: WO2013/187479
PCT Pub. Date: Dec. 19, 2013

(65) Prior Publication Data
US 2015/0147631 A1 May 28, 2015

(30) Foreign Application Priority Data

Jun. 15, 2012 (JP) .................................. 2012-136079
Jun. 4, 2013 (JP) .................................. 2013-118093

(51) Int. Cl.
*H01M 6/12* (2006.01)
*H01M 6/46* (2006.01)
(Continued)

(52) U.S. Cl.
CPC ....... *H01M 2/0222* (2013.01); *H01M 2/0413* (2013.01); *H01M 2/0465* (2013.01);
(Continued)

(58) Field of Classification Search
CPC ..... H01M 6/46; H01M 2/0207; H01M 2/0469
See application file for complete search history.

(56) References Cited

U.S. PATENT DOCUMENTS 3,907,593 A * 9/1975 Marincic ................. H01M 6/14
361/501
2002/0182492 A1* 12/2002 Kimura ............... H01M 2/0222
429/162
(Continued)

FOREIGN PATENT DOCUMENTS

JP 56-126771 U 9/1981
JP 58-51572 U 4/1983
(Continued)

OTHER PUBLICATIONS

Office Action dated Feb. 2, 2016, issued in counterpart Japanese Patent Application No. 2012-136079, with English translation. (6 pages).
(Continued)

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

There is provided a flat battery including a positive electrode can, a negative electrode can, a positive electrode material, a negative electrode material, and a positive electrode ring provided on an inner surface of a bottom of the positive electrode can to hold one of the positive electrode material and the negative electrode material. The positive electrode ring has a side wall and a flange that extends outward to overlap an open end of a circumferential wall of the negative electrode can. The flange is placed between the open end of the circumferential wall of the negative electrode can and the inner surface of the bottom of the positive electrode can.

14 Claims, 5 Drawing Sheets

(51) Int. Cl.
    *H01M 2/08*     (2006.01)
    *H01M 10/46*    (2006.01)
    *H01M 2/02*     (2006.01)
    *H01M 4/40*     (2006.01)
    *H01M 2/04*     (2006.01)
    *H01M 2/18*     (2006.01)
    *H01M 4/04*     (2006.01)

(52) U.S. Cl.
    CPC ............ *H01M 2/08* (2013.01); *H01M 2/18* (2013.01); *H01M 4/04* (2013.01); *H01M 4/405* (2013.01); *H01M 2220/30* (2013.01)

(56) References Cited

U.S. PATENT DOCUMENTS

2003/0064289 A1    4/2003  Yamaura et al.
2010/0183912 A1*   7/2010  Pfrommer .......... H01M 2/0222
                                                        429/174

FOREIGN PATENT DOCUMENTS

| | | |
|---|---|---|
| JP | 58-201264 A | 11/1983 |
| JP | 01-197964 A | 8/1989 |
| JP | 03-040373 A | 2/1991 |
| JP | 10-112308 A | 4/1998 |
| JP | 2008-103109 A | 5/2008 |
| JP | 2010-212207 A | 9/2010 |
| JP | 2010-212208 A | 9/2010 |
| WO | 02/13294 A1 | 2/2002 |

OTHER PUBLICATIONS

Extended European Search Report dated Jan. 12, 2016, issued in counterpart European Patent Application No. 13803615.7. (7 pages).

Office Action dated Jan. 31, 2017, issued in Japanese Patent Application No. 2013-118093 with English translation (6 pages).

* cited by examiner

FLAT BATTERY

TECHNICAL FIELD

The present invention relates to a flat battery such as a coin-shaped battery.

BACKGROUND ART

There have been known conventional flat batteries having a positive electrode material and a negative electrode material provided between a closed-bottom tubular exterior can and a sealing can provided to cover the opening of the exterior can. As disclosed by JP-A 2008-103109, one of such known flat batteries includes a positive electrode ring that holds a positive electrode pellet and is welded to the inside of a positive electrode can by resistance welding or laser welding. In this way, the positive electrode ring can be prevented from moving with respect to the positive electrode can and the positive electrode can and the positive electrode ring can be contacted in a stable manner.

DISCLOSURE OF THE INVENTION

When a base (positive electrode ring) holding a positive electrode material (positive electrode pellet) is welded to an exterior can (positive electrode can) as disclosed by JP-A 2008-103109, the operation of welding the base to the exterior can is necessary in assembling a flat battery.

Furthermore, in welding the base to the exterior can as described above, the weld strength between the base and the exterior can greatly changes depending on the condition for welding. When the base is welded to the exterior can, it is difficult to determine whether the weld strength between the base and the exterior can is sufficient by non-destructive inspection.

An object of the present invention is to provide a flat battery having a base provided on an inner surface of a bottom of an exterior can to hold one of a positive electrode material and a negative electrode material that can be easily produced and can surely restrain the movement of the base with respect to the exterior can.

A flat battery according to one embodiment of the present disclosure includes a closed-bottom tubular exterior can, a closed-bottom sealing can that covers an opening of the exterior can, a positive electrode material and a negative electrode material provided in a space formed between the exterior can and the sealing can, and a base used to fix one of the positive electrode material and the negative electrode material to the exterior can. The exterior can has a bottom and a tubular side wall that extends in a tube axis direction. The sealing can has a circumferential wall positioned inside of the exterior can while covering the opening of the exterior can. The base has a holder that holds the one material and a flange that extends outward from the holder to overlap an open end of the circumferential wall of the sealing can when viewed in the tube axis direction. The flange is placed between the open end of the circumferential wall of the sealing can and an inner surface of the bottom of the exterior can (a first feature).

According to the above-described feature, the base that holds one of the positive electrode material and the negative electrode material can be fixed to the exterior can and the sealing can without being welded to the bottom of the exterior can. More specifically, the flange of the base is formed to overlap the open end of the circumferential wall of the sealing can when viewed in the tube axis direction of the exterior can and placed between the outer circumferential end of the circumferential wall of the sealing can and the inner surface of the bottom of the exterior can, so that the flange is fixed to the exterior can and the sealing can.

This eliminates the necessity of welding the exterior can and the base, and therefore the movement of the base with respect to the exterior can may be restrained by such an easily producible arrangement.

In the first feature, the inner surface of the bottom of the exterior can is preferably flat (a second feature). If the inner surface of the bottom of the exterior can is flat in this way, the base easily moves on the inner surface of the bottom of the exterior can. In contrast, as in the first feature as described above, when the flange of the base is placed between the open end of the circumferential wall of the sealing can and the inner surface of the bottom of the exterior can, the movement of the base can be restrained.

In the first or second feature, the flange is preferably formed to have such a size that the flange overlaps a part of the open end of the circumferential wall of the sealing can that projects most in the tube axis direction when viewed in the tube axis direction (a third feature)

In this way, the flange of the base can be more surely fixed to the sealing can and the exterior can. More specifically, the flange of the base overlaps the most projecting part of the open end of the circumferential wall of the sealing can in the tube axis direction of the sealing can when viewed in the tube axis direction of the exterior can, so that the flange is placed more securely between the open end of the circumferential wall of the sealing can and the inner surface of the bottom of the exterior can.

In any one of the first to third features, the flange is preferably formed to have such a size that its outer circumferential end is positioned outward of the open end of the circumferential wall of the sealing can when viewed in the tube axis direction (a fourth feature).

In this way, the flange of the base can be more surely fixed to the sealing can and the exterior can. More specifically, the flange of the base has its outer circumferential end positioned outward of the open end of the circumferential wall of the sealing can when viewed in the tube axis direction, and therefore the flange can be placed more securely between the open end of the circumferential wall of the sealing can and the inner surface of the bottom of the exterior can.

In any of the first to fourth features, the flange is preferably formed to have such a size that its outer circumferential end is positioned inward of the outermost circumference of the inner surface of the bottom of the exterior can (a fifth feature).

In this way, the flange of the base can be placed between the open end of the circumferential wall of the sealing can and the inner surface of the bottom of the exterior can without reducing the sealing ability.

In any of the first to fifth features, the flange is preferably formed at the entire outer circumference of the holder to surround the holder (a sixth feature). In this way, the flange formed at the entire outer circumference of the holder can be placed between the open end of the circumferential wall of the sealing can and the inner surface of the bottom of the exterior can. Therefore, the base can be more surely fixed to the sealing can and the exterior can.

In the first feature, preferably, the flange is formed at least at a part of the outer circumference of the holder in an opposing manner across the holder and has such a size that when a first part of its outer circumferential end is positioned at the outermost circumference of the inner surface of the bottom of the exterior can as viewed in the tube axis direction, a second part of the outer circumferential end of the flange that is opposite the first part across the holder overlaps the open end of the circumferential wall of the sealing can (a seventh feature).

In this way, when the base is provided more inward of the exterior can than a designed position, the flange of the base can be placed more surely between the open end of the circumferential wall of the sealing can and the inner surface of the bottom of the exterior can. Therefore, the base can be more surely fixed to the sealing can and the exterior can.

In any of the first to seventh features, preferably, a seal member is provided between the open end of the circumferential wall of the sealing can and the inner surface of the bottom of the exterior can and the flange is placed between the seal member and the inner surface of the bottom of the exterior can (an eighth feature).

In this feature, the open end of the circumferential wall of the exterior can is caulked to the circumferential wall of the sealing can, so that the flange of the base can be placed between the open end of the circumferential wall of the sealing can and the inner surface of the bottom of the exterior can while sealing between the sealing can and the exterior can by the seal member. Therefore, in a readily producible arrangement, the sealing ability by the seal member is secured while the base can be fixed to the sealing can and the exterior can.

In any one of the first to eighth features, the flat battery preferably further includes a reinforcing member provided at a part of the one material that is not covered with the base to reinforce the part (a ninth feature).

According to the feature, one of the positive electrode material and the negative electrode material can be reinforced by the base and the reinforcing member. More specifically, the reinforcing member reinforces the part of the one material not covered with the base, and therefore, the one material can be more surely reinforced than reinforcement only with the base.

Therefore, when the flat battery is used as a power source for a device on which large vibrations or the like are applied, the one material can be prevented from being greatly damaged. Therefore, the flat battery can have improved vibration resistance and shock resistance as compared to conventional cases.

In the ninth feature, preferably, the one material is formed to have a columnar shape that extends in the tube axis direction, the base is provided to cover a side surface of the one material, and the reinforcing member is provided at an end surface of the one material in the tube axis direction (a tenth feature).

In this way, the side surface and the end surface of the one material having a columnar shape can be reinforced by the base and the reinforcing member, respectively. Therefore, the one material can surely have improved strength.

In the tenth feature, the reinforcing member is provided in the one material to extend in a direction that crosses the tube axis direction (an eleventh feature). In this way, the one material can surely have improved strength in the tube axis direction.

In the tenth or eleventh feature, the one material is preferably provided so that the end surface is positioned on the exterior can (a twelfth feature). In this way, one of the end surfaces in the tube axis direction of one material provided with the reinforcing member is provided on the exterior can, so that the material and the exterior can may be more surely contacted. In other words, the reinforcing member is provided at one end surface of one material positioned on the exterior can, so that the rigidity of the end surface can be improved and the shape of the end surface can be more surely maintained. Therefore, the one end surface of the material and the exterior can may be more surely electrically contacted.

According to any one of the ninth to twelfth features, the reinforcing member is preferably a mesh member (a thirteenth feature). In this way, when for example a material in a powder form is compacted to form the one material, the powder material enters spaces of the mesh shaped reinforcing member. Therefore, the reinforcing member and the one material can be more securely integrated.

In a flat battery according to one embodiment of the disclosure, a base that holds one of a positive electrode material and a negative electrode material has a flange provided to overlap an open end of a circumferential wall of a sealing can when viewed in a tube axis direction of an exterior can. In this way, a readily producible arrangement that can surely restrain the movement of the base with respect to the exterior can is provided.

MODES FOR CARRYING OUT THE INVENTION

Figure 1:
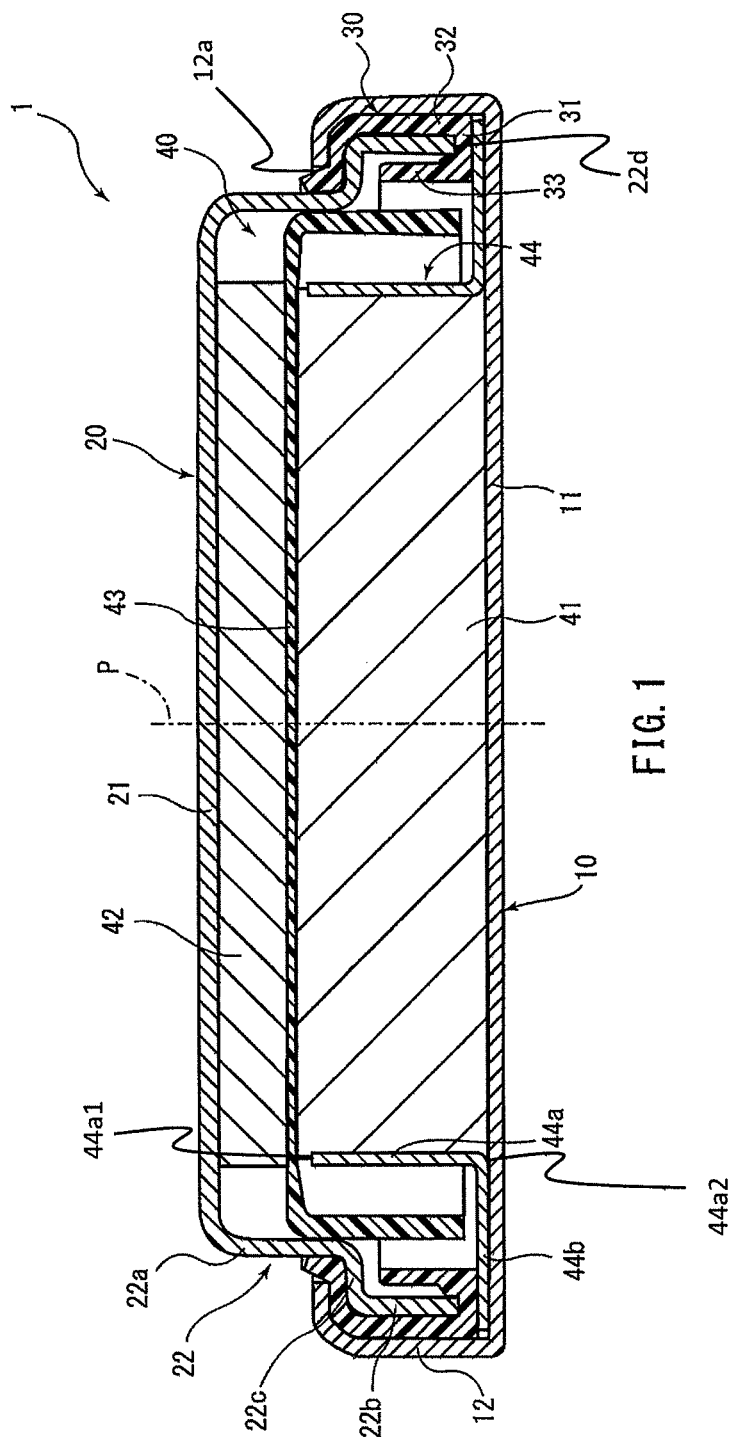
FIG. 1 is a sectional view of a general structure of a flat battery according to a first embodiment.

Now, embodiments will be described in detail in conjunction with the accompanying drawings in which the same or corresponding portions are designated by the same reference characters and their description will not be repeated.

First Embodiment

Overall Structure

FIG. 1 is a sectional view of a general structure of a flat battery 1 according to one embodiment. The flat battery 1 includes a closed-bottom cylindrical positive electrode can 10 (exterior can), a negative electrode can 20 (sealing can) that covers the opening of the positive electrode can 10, a gasket 30 provided between a circumferential side of the positive electrode can 10 and a circumferential side of the negative electrode can 20, and a generating element 40 stored in a space formed between the positive electrode can 10 and the negative electrode can 20. The positive electrode can 10 and the negative electrode can 20 are assembled to form the flat battery 1 having a generally flat coin shape. A non-aqueous electrolyte (not shown) is enclosed in the space formed between the positive electrode can 10 and the negative electrode can 20 in addition to the generating element 40.

The positive electrode can 10 is made of a metal material such as stainless steel and formed to have a closed-bottom cylindrical shape by press-forming. The positive electrode can 10 includes a circular bottom 11 and a cylindrical circumferential wall 12 (tubular side wall) formed continuously with the bottom 11 at its outer circumference. The circumferential wall 12 is provided to extend perpendicularly to the bottom 11 in a longitudinal section. As will be described, as the gasket 30 is placed between the positive electrode can 10 and the negative electrode can 20, the open end of the circumferential wall 12 of the positive electrode can 10 is bent inwardly and caulked to the outer circumference of the negative electrode can 20. In FIG. 1, "P" represents a tube axis of the positive electrode can 10. The circumferential wall 12 extends in the tube axis direction of the positive electrode can 10. The positive electrode can 10 has a first open end 12a. The negative electrode can 20 has a second open end 22d. The cylindrical side wall 44a has a first end 44a1 and a second end 44a2.

The bottom 11 of the positive electrode can 10 is formed to have a flat plate shape so that its inside surface is flat. More specifically, the positive electrode can 10 according to the embodiment has the flat bottom 11 with no steps at its outer circumference.

The negative electrode can 20 is also made of a metal material such as stainless steel and formed by press-forming to have a closed-bottom cylindrical shape similarly to the positive electrode can 10. The negative electrode can 20 includes a circular flat portion 21 and a cylindrical circumferential wall 22 formed continuously with the flat portion 21 at its outer circumference. The circumferential wall 22 is also provided to extend perpendicularly to the flat portion 21 in a longitudinal section similarly to the positive electrode can 10. The circumferential wall 22 has an outspread portion 22b where its diameter increases stepwise with respect to a base end portion 22a of the circumferential wall 22. In other words, the circumferential wall 22 has a stepped portion 22c between the base end portion 22a and the outspread portion 22b. As shown in FIG. 1, the open end of the circumferential wall 12 of the positive electrode can 10 is bent and caulked to the stepped portion 22c. In this way, the positive electrode can 10 and the negative electrode can 20 are connected on their circumferential sides.

The gasket 30 (seal member) includes polyphenylenesulfide (PPS) as a principal component and is made of a resin composition that contains PPS and an olefin based elastomer. The gasket 30 is provided as it is placed between the circumferential wall 12 of the positive electrode can 10 and the circumferential wall 22 of the negative electrode can 20. The gasket 30 is also provided as it is placed between the open end of the circumferential wall 22 of the negative electrode can 20 and the bottom 11 of the positive electrode can 10. More specifically, the gasket 30 includes a ring shaped base 31, an outer tubular wall 32 that projects from an outer circumferential edge of the base 31, and an inner tubular wall 33 that extends from an inner circumferential edge of the base 31 in the direction in which the outer tubular wall 32 extends. In the gasket 30 according to the embodiment, the base 31, the outer tubular wall 32, and the inner tubular wall 33 are integrally formed.

In the gasket 30 shown in FIG. 1, the base 31 is provided on a flange 44b of a positive electrode ring 44 that will be described. The base 31 of the gasket 30 and the flange 44b of the positive electrode ring 44 are placed between the open end of the circumferential wall 22 of the negative electrode can 20 and an outer circumferential part of the bottom 11 of the positive electrode can 10.

The gasket 30 is provided to cover the outspread portion 22b of the negative electrode can 20. In other words, the gasket 30 is provided at the outspread portion 22b of the negative electrode can 20 so that the outspread portion 22b of the negative electrode can 20 is positioned between the outer tubular wall 32 and the inner tubular wall 33 of the gasket 30. In this way, the outer tubular wall 32 of the gasket 30 is placed between the circumferential wall 12 of the positive electrode can 10 and the circumferential wall 22 of the negative electrode can 20. The base 31 and the outer tubular wall 32 of the gasket 30 have a necessary thickness to seal the gap between the positive electrode can 10 and the negative electrode can 20 as they are placed between the positive electrode can 10 and the negative electrode can 20.

The gasket 30 is provided between the circumferential wall 12 of the positive electrode can 10 and the circumferential wall 22 of the negative electrode can 20 in this manner, so that the positive electrode can 10 and the negative electrode can 20 can be insulated on their circumferential sides. As the gasket 30 is placed between the circumferential wall 12 of the positive electrode can 10 and the circumferential wall 22 of the negative electrode can 20, the circumferential wall 12 of the positive electrode can 10 is bent and caulked to the circumferential wall 22 of the negative electrode can 20, so that the gap between the circumferential wall 12 of the positive electrode can 10 and the circumferential wall 22 of the negative electrode can 20 can be sealed by the gasket 30. In other words, in the gasket 30, the outer tubular wall 32 placed between the circumferential wall 12 of the positive electrode can 10 and the stepped portion 22c of the negative electrode can 20 and the base 31 placed between the open end of the circumferential wall 22 of the negative electrode can 20 and the bottom 11 of the positive electrode can 10 both serve as a seal.

The positive electrode ring 44 that will be described has its flange 44b provided between the base 31 of the gasket 30 and the bottom 11 of the positive electrode can 10, so that the flange 44b can be placed between the base 31 of the gasket 30 and the bottom 11 of the positive electrode can 10. In this way, the flange 44b of the positive electrode ring 44 can be fixed to the positive electrode can 10 without being welded to the bottom 11 of the positive electrode can 10.

The generating element 40 includes a positive electrode material 41 produced by forming a positive electrode active material and the like to have a disk shape, a negative electrode material 42 produced by forming metal lithium or a lithium alloy as a negative electrode active material to have a disk shape, and a non-woven fabric separator 43. As shown in FIG. 1, the positive electrode material 41 is positioned in the positive electrode can 10 while the negative electrode material 42 is positioned in the negative electrode can 20. The separator 43 is provided between the positive electrode material 41 and the negative electrode material 42.

The positive electrode material 41 contains manganese dioxide as a positive electrode active material. The positive electrode material 41 is formed as follows. Manganese dioxide is mixed with graphite, tetrafluoroethylene-hexafluoropropylene copolymer, and hydroxypropyl cellulose and thus a positive electrode mixture is prepared.

The positive electrode material 41 is for example provided in the positive electrode ring 44 as a columnar block of the positive electrode mixture placed in the positive electrode ring 44 is smashed. The positive electrode material 41 may be formed in the positive electrode ring 44 by any other method. For example, the positive electrode mixture in a powder form may be filled within the positive electrode ring 44 and pressed and then the formed material may be heated.

More specifically, the positive electrode material 41 is mounted with the positive electrode ring 44 (base) that covers a part of a side surface of the positive electrode material 41 so that the positive electrode ring 44 holds the positive electrode material 41. The positive electrode ring 44 will be described in detail.

The separator 43 is made of non-woven fabric produced from polybutylene terephthalate fiber. The separator 43 is impregnated with a non-aqueous electrolyte in the flat battery 1. The separator 43 has a thickness about in the range from 0.3 mm to 0.4 mm.

The non-aqueous electrolyte is a solution produced by dissolving $LiClO_4$ in a mixture solution of propylene carbonate and 1, 2-dimethoxyethane.

Structure of Positive Electrode Ring

Figure 2:
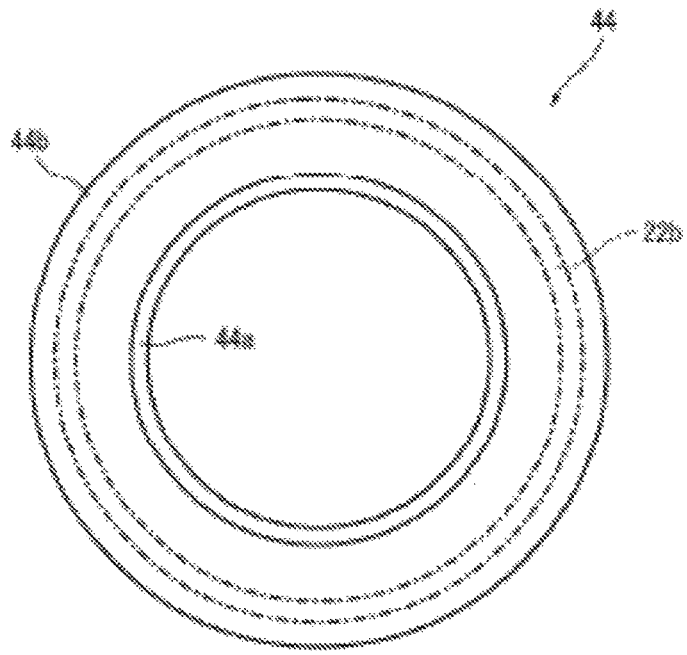
FIG. 2 is a top view of a positive electrode ring showing a positional relation between the positive electrode ring and an open end of a circumferential wall of a negative electrode can.

Now, a detailed structure of the positive electrode ring 44 will be described with reference to FIGS. 1 and 2.

The positive electrode ring 44 is made of stainless steel or the like having prescribed rigidity and conductivity. The positive electrode ring 44 includes a cylindrical side wall 44a (holder) in contact with a side surface of the positive electrode material 41 and an annular flange 44b that extends outward from one end of the side wall 44a. According to the embodiment, the side wall 44a and the flange 44b are integrally formed. More specifically, the positive electrode ring 44 is formed to have a substantial hat shape.

The side wall 44a has an inner diameter equal to or smaller than the outer diameter of the positive electrode material 41 so that it can hold the cylindrical (circular columnar) positive electrode material 41 therein. More specifically, the cylindrical positive electrode material 41 is held at the inner surface of the side wall 44a.

The flange 44b extends outward from one end of the cylindrical side wall 44a entirely around the side wall 44a. More specifically, as shown in FIG. 2, the flange 44b is formed to have an annular shape. As shown in FIGS. 1 and 2, the flange 44b has such a size that its outer circumferential end is positioned outward of the open end of the outspread portion 22b of the negative electrode can 20 (open end of the circumferential wall 22) when viewed in the tube axis direction of the positive electrode can 10. According to the embodiment, the flange 44b has an outer diameter equal to an outer diameter of the inner surface of the bottom 11 of the positive electrode can 10 or an outer diameter between the outer diameter of the open end of the outspread portion 22b of the negative electrode can 20 and the diameter of the inner surface of the positive electrode can 10 at the bottom 11.

As described above, the flange 44b of the positive electrode ring 44 is formed to have such a size that its outer circumferential end is positioned outward of the open end of the outspread portion 22b of the negative electrode can 20 when viewed in the tube axis direction of the positive electrode can 10, and therefore the flange 44b can be placed between the circumferential wall 22 of the negative electrode can 20 and the bottom 11 of the positive electrode can 10. In this way, the movement of the positive electrode ring 44 with respect to the positive electrode can 10 and the negative electrode can 20 can be restrained. The flange 44b has its outer circumferential end positioned inward of the outermost circumference of the inner surface of the bottom 11 of the positive electrode can 10 when viewed in the tube axis direction of the positive electrode can 10. In this way, the gasket 30 and the bottom 11 of the positive electrode can 10 can be surely contacted in addition to the contact between the flange 44b and the bottom 11. Therefore, the sealing ability can be prevented from being degraded.

Figure 3:
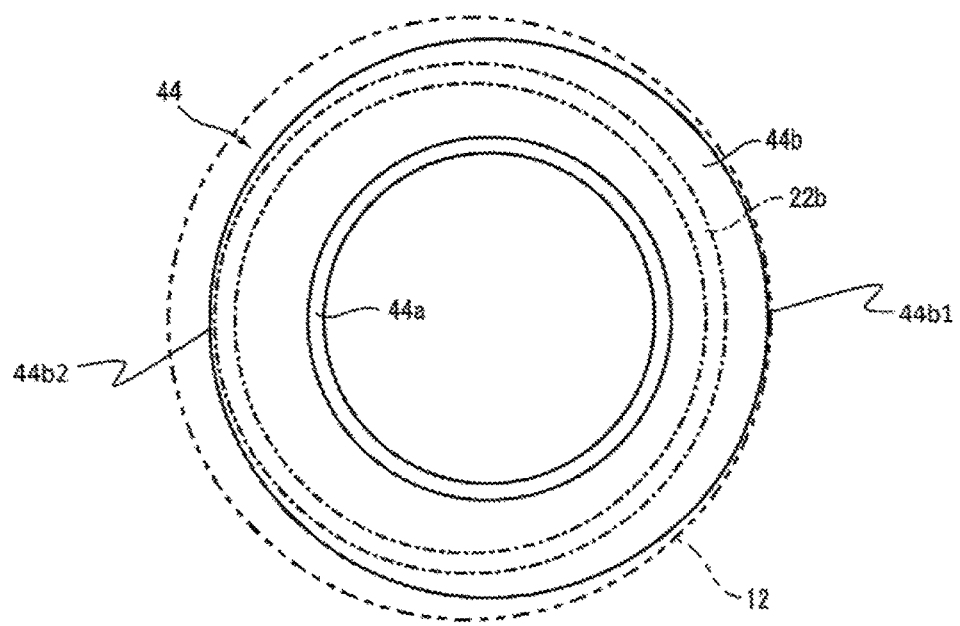
FIG. 3 is a view corresponding to FIG. 2 showing the positive electrode ring provided in a position different from a designed position in a positive electrode can.

As shown in FIG. 3, the flange 44b more preferably has such a size that when a part of its outer circumferential end is positioned on the outermost circumference of the inner surface of the bottom 11 of the positive electrode can 10 as viewed in the tube axis direction of the positive electrode can 10, a part of the outer circumferential end of the flange 44b on the opposite side across the side wall 44a overlaps the open end of the outspread portion 22b of the negative electrode can 20. In this way, when the positive electrode ring 44 is provided in a position different from a designed position on the bottom 11 of the positive electrode can 10, the positive electrode ring 44 can be placed between the open end of the outspread portion 22b of the negative electrode can 20 and the inner surface of the bottom 11 of the positive electrode can 10. Therefore, the positive electrode ring 44 can be fixed more securely to the positive electrode can 10 and the negative electrode can 20. The flange 44b has a first outermost circumference part 44b1 and a second outermost circumference part 44b2.

According to the embodiment, as shown in FIG. 1, the flange 44b of the positive electrode ring 44 is provided between the base 31 of the gasket 30 and the bottom 11 of the positive electrode can 10. More specifically, the flange 44b is placed between the open end of the circumferential wall 22 of the negative electrode can 20 and the bottom 11 of the positive electrode can 10 through the gasket 30.

Method of Producing Flat Battery

Now, a method of producing the flat battery 1 having the above-described structure will be described.

A cylindrical positive electrode can 10 and the negative electrode can 20 both having a closed bottom are formed. A positive electrode ring 44 that holds a cylindrical positive electrode material 41 is provided in the positive electrode can 10 and a separator 43 and a negative electrode material 42 are placed on the positive electrode material 41 in the mentioned order. A gasket 30 is mounted to a circumferential wall 22 of the negative electrode can 20.

The negative electrode can 20 mounted with the gasket 30 is provided to the positive electrode can 10 having the positive electrode ring 44, the separator 43, and the negative electrode material 42 stored therein to cover the opening of the positive electrode can 10. The negative electrode can 20 is assembled to the positive electrode can 10 so that the circumferential wall 22 is positioned in the positive electrode can 10. As the positive electrode can 10 and the negative electrode can 20 are assembled, the open end of the circumferential wall 12 of the positive electrode can 10 is caulked to the circumferential wall 22 of the negative electrode can 20.

In this way, the flat battery 1 as shown in FIG. 1 is obtained.

Advantages of First Embodiment

According to the embodiment, the positive electrode ring 44 has the flange 44b placed between the open end of the circumferential wall 22 of the negative electrode can 20 and the inner surface of the bottom 11 of the positive electrode can 10. In this way, the positive electrode ring 44 can be fixed to the positive electrode can 10 and the negative electrode can 20 without being welded to the positive electrode can 10. Therefore, the movement of the positive electrode ring 44 with respect to the positive electrode can 10 can be restrained by a readily producible arrangement.

The movement of the positive electrode ring 44 with respect to the positive electrode can 10 can be restrained as described above, so that the separator 43 positioned between the positive electrode material 41 and the negative electrode material 42 can be prevented from being damaged or the electrical contact between the positive electrode material 41 and the positive electrode can 10 can be prevented from becoming instable.

Also according to the embodiment, the flange 44b of the positive electrode ring 44 has its outer circumferential end positioned outward of the open end of the outspread portion 22b of the negative electrode can 20 (i.e. the open end of the circumferential wall 22) when viewed in the tube axis direction of the positive electrode can 10. In this way, the flange 44b of the positive electrode ring 44 can surely be placed between the open end of the circumferential wall 22 of the negative electrode can 20 and the inner surface of the bottom 11 of the positive electrode can 10. Therefore, the positive electrode ring 44 can be more surely fixed to the positive electrode can 10 and the negative electrode can 20.

Furthermore, the flange 44b of the positive electrode ring 44 is formed along the entire outer circumference of the side wall 44a. In this way, a greater range of the flange 44b can be placed between the open end of the circumferential wall 22 of the negative electrode can 20 and the inner surface of the bottom 11 of the positive electrode can 10. Therefore, the movement of the positive electrode ring 44 with respect to the positive electrode can 10 can be more surely restrained.

Second Embodiment

Figure 4:
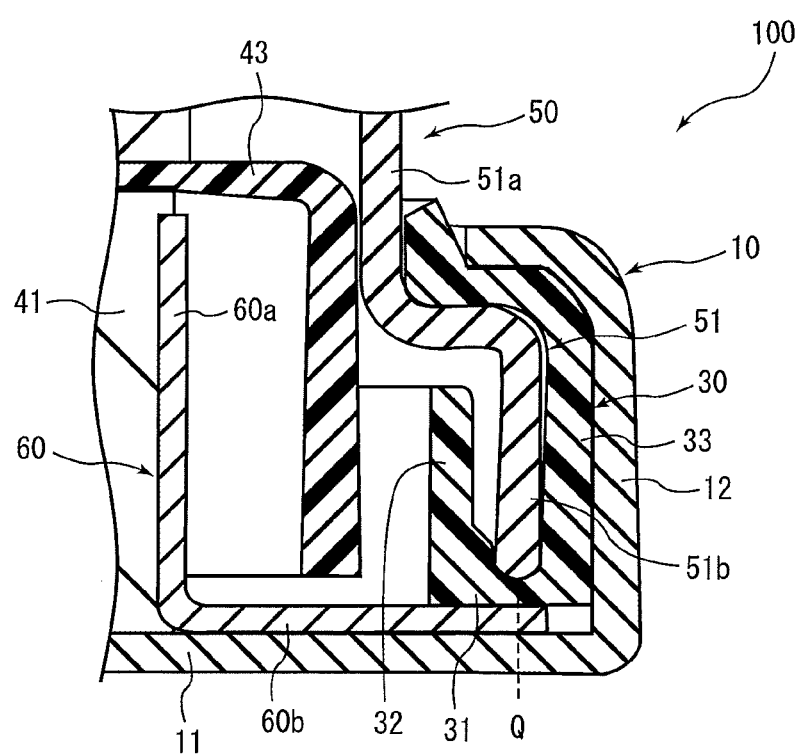
FIG. 4 is a partly enlarged sectional view of a general structure of a flat battery according to a second embodiment.

FIG. 4 is a partly enlarged view of a structure of a flat battery 100 according to a second embodiment. According to the embodiment, a circumferential wall 51 of a negative electrode can 50 has an open end having a different shape from the first embodiment and a positive electrode ring 60 has a flange 60b having a different length from the first embodiment. In the following description, elements having the same structures as those according to the first embodiment will be designated by the same reference characters and will not be described while only different elements from the first embodiment will be described.

As shown in FIG. 4, a thickness-wise center portion of the circumferential wall 51 of the negative electrode can 50 at the open end of an outspread portion 51b (i.e., the open end of the circumferential wall 51) projects in the tube axis direction of the positive electrode can 10. More specifically, an end surface of the open end of the outspread portion 51b of the negative electrode can 50 is formed to have a circular arc shape in a thickness-wise section of the outspread portion 51b.

The end surface of the open end of the outspread portion 51b of the negative electrode can 50 may have such a circular arc shape entirely or partly along the circumference in a thickness-wise cross section of the outspread portion 51b. Alternatively, the end surface of the open end of the outspread portion 51b may have any shape other than the circular arc shape in a thickness-wise section of the outspread portion 51b.

The flange 60b of the positive electrode ring 60 has such a size that its outer circumferential side is positioned outward of the most outwardly projecting part (Q in FIG. 4) of the negative electrode can 50 in the tube axis direction at the open end of the outspread portion 51b of the negative electrode can 50 when viewed in the tube axis direction of the positive electrode can 10.

In this way, the flange 60b of the positive electrode ring 60 is in a position where the distance between the circumferential wall 51 of the negative electrode can 50 and the bottom 11 of the positive electrode can 10 is smallest. Therefore, the flange 60b of the positive electrode ring 60 can be placed more surely between the circumferential wall 51 of the negative electrode can 50 and the bottom 11 of the positive electrode can 10.

The flange 60b of the positive electrode ring 60 may have such a size that its outer circumferential end is positioned outward of the open end of the outspread portion 51b of the negative electrode can 50 when viewed in the tube axis direction of the positive electrode can 10. The flange 60b of the positive electrode ring 60 may have an outer diameter equal to that of the inner surface of the bottom 11 of the positive electrode can 10.

In FIG. 4, "51a" refers to the base end of the circumferential wall 51 of the negative electrode can 50 and "60a" refers to the side wall of the positive electrode ring 60.

Advantages of Second Embodiment

According to the embodiment, the flange 60b of the positive electrode ring 60 that holds the positive electrode material 41 has such a size that its outer circumferential end is positioned outward of the most projecting part of the negative electrode can 50 in the tube axis direction at the open end of the outspread portion 51b of the negative electrode can 50 when viewed in the tube axis direction of the positive electrode can 10. In this way, the flange 60b of the positive electrode ring 60 can be placed more surely between the circumferential wall 51 of the negative electrode can 50 and the bottom 11 of the positive electrode can 10. Therefore, the flange 60b of the positive electrode ring 60 can be fixed more surely to the negative electrode can 50 and the positive electrode can 10.

Third Embodiment

Figure 5:
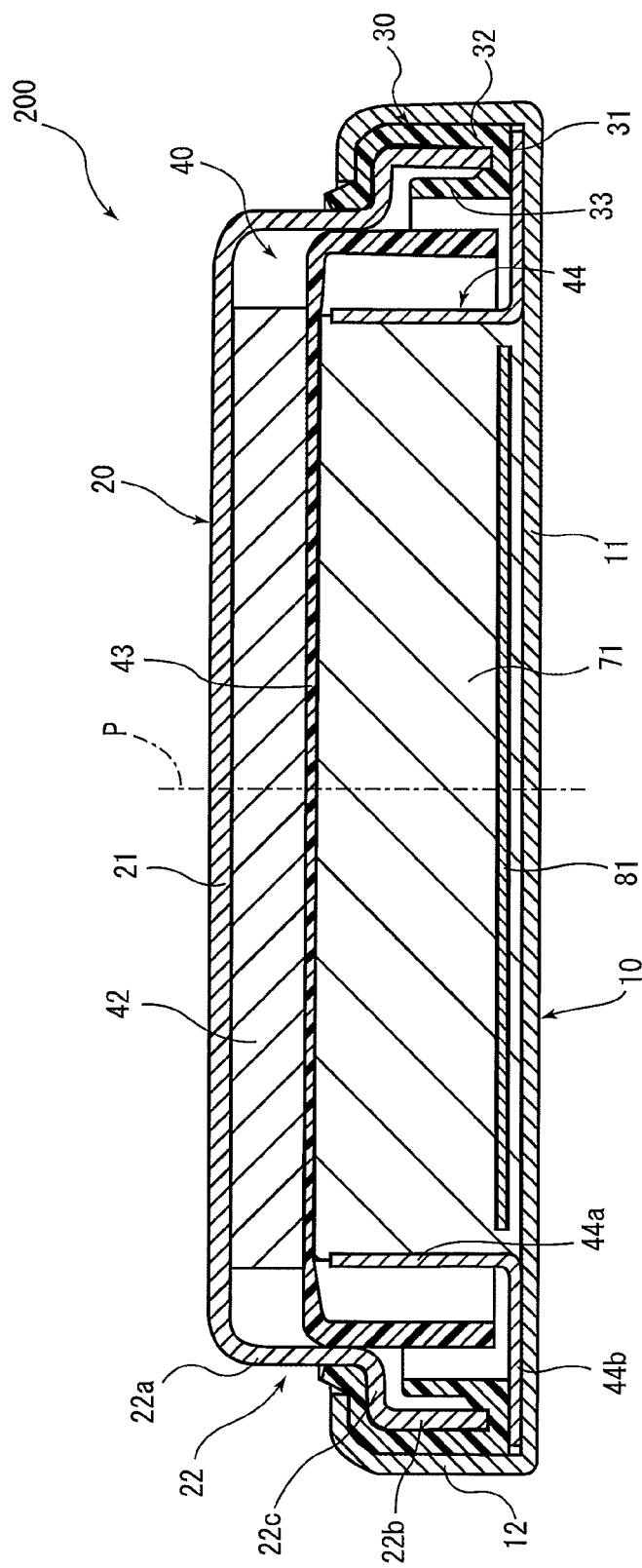
FIG. 5 is a view corresponding to FIG. 1 showing a general structure of a flat battery according to a third embodiment.

FIG. 5 is a sectional view of a general structure of a flat battery 200 according to a third embodiment. This embodiment is different from the first embodiment in that a mesh member 81 as a reinforcing member is provided in a positive electrode material 71. In the following description, elements having the same structures as those according to the first embodiment are designated by the same reference characters and will not be described while only different elements from the first embodiment will be described.

As shown in FIG. 5, the mesh member 81 as the reinforcing member is provided at one end of a positive electrode can 10 in the tube axis direction in the positive electrode material 71. In other words, the mesh member 81 is provided in the positive electrode ring 44 together with a positive electrode mixture in a powder form and pressed so that the mesh member is integrated with the positive electrode mixture powder. According to the embodiment, the mesh member 81 is used as the reinforcing member but any other member capable of reinforcing the positive electrode material 71 such as a plate member may be used as the reinforcing member.

The positive electrode material 71 contains manganese dioxide as a positive electrode active material similarly to the positive electrode material 41 according to the first embodiment and is held by the positive electrode ring 44. More specifically, a side surface of the positive electrode material 71 having a substantially cylindrical shape is covered with the positive electrode ring 44.

The positive electrode material 71 is obtained by pressing positive electrode mixture powder, followed by baking as will be described. The substantially cylindrical positive electrode material 71 is formed as follows.

Manganese dioxide is mixed with graphite, tetrafluoroethylene-hexafluoropropylene copolymer, and hydroxypropyl cellulose and thus a positive electrode mixture is prepared.

Powder of the positive electrode mixture is filled within the positive electrode ring 44 and pressed and then the formed material is heated, so that the positive electrode material 71 is formed to have a cylindrical shape in the positive electrode ring 44. Any other method may be employed instead of the above provided that the positive electrode material 71 can be formed into a pellet shape in the positive electrode ring 44.

As described above, the positive electrode material 71 is obtained by pressing the positive electrode mixture powder, followed by baking and therefore the material is brittle and easily broken. Therefore, the positive electrode material 71 is formed in the positive electrode ring 44 as described above, so that the side surface of the positive electrode material 71 can be reinforced by the positive electrode ring 44. In addition, the mesh member 81 provided in the positive electrode material 71 can reinforce the positive electrode material 71. The arrangement to reinforce the positive electrode material 71 will be described later.

Arrangement to Reinforce Positive Electrode Material

The arrangement to reinforce the positive electrode material 71 will be described with reference to FIG. 5.

As shown in FIG. 5, the positive electrode material 71 having a substantially cylindrical shape has a side surface covered with the positive electrode ring 44. In this way, the side surface of the positive electrode material 71 can be reinforced by the positive electrode ring 44. Therefore, the side surface of the positive electrode material 71 can be prevented from being damaged for example by vibrations or shocks given to the flat battery 200.

As shown in FIG. 5, the mesh member 81 is provided at one end of the positive electrode material 71 in the tube axis direction of the positive electrode can 10. The mesh member 81 is provided at one of the ends of the positive electrode material 71 in the tube axis direction positioned on the bottom 11 of the positive electrode can 10. The mesh member 81 is provided in the positive electrode material 71 to extend in a direction crossing the tube axis P or to be substantially parallel to an end surface of the substantially cylindrical positive electrode material 71. The mesh member 81 is buried in the positive electrode material 71 to be integrated with the positive electrode mixture powder. More specifically, providing the mesh member 81 in the positive electrode material 71 allows the positive electrode mixture powder to enter the mesh spaces of the mesh member 81 when the positive electrode material 71 is formed, so that the mesh member 81 and the positive electrode mixture are integrated easily.

As described above, the mesh member 81 is provided at one end of the positive electrode material 71 in the tube axis direction, so that the part of the positive electrode material 71 that is not covered with the positive electrode ring 44, in other words, one end of the positive electrode material 71 in the tube axis direction can have improved strength. In addition, as the mesh member 81 is provided in the positive electrode material 71 and integrated with the positive electrode mixture, so that the positive electrode material 71 can surely be reinforced. Furthermore, the mesh member 81 is provided substantially parallel to the end surface of the positive electrode material 71 and therefore the positive electrode material 71 can have improved strength in the tube axis direction.

Since the mesh member 81 is provided at one of the ends of the positive electrode material 71 in the tube axis direction that is positioned closer to the bottom 11 of the positive electrode can 10, the positive electrode material 71 and the bottom 11 of the positive electrode can 10 can be more surely contacted. In other words, providing the mesh member 81 at one end of the positive electrode material 71 improves the rigidity of the end and allows the shape of the end to be surely maintained.

The mesh member 81 is a substantially circular member made of stainless steel. The mesh member 81 has an outer diameter smaller than that of the positive electrode material 71. More specifically, the outer diameter of the mesh member 81 is smaller than the inner diameter of the side wall 44a of the positive electrode ring 44. In this way, the mesh member 81 is positioned inward of the side wall 44a of the positive electrode ring 44.

The mesh member 81 is provided inward of the side wall 44a of the positive electrode ring 44, so that the positive electrode material 71 can have more improved strength. More specifically, while the side surface of the positive electrode material 71 is reinforced by the side wall 44a, the strength of the positive electrode material 71 in the tube axis direction can be improved by the mesh member 81.

Now, advantages provided by reinforcing the positive electrode material 71 by the positive electrode ring 44 and the mesh member 81 will be described.

A maximum load value for the positive electrode material 71 pressed by a round bar as it was held by the positive electrode ring 44 was measured in order to measure the strength of the positive electrode material 71. More specifically, as the positive electrode material 71 was provided on a circumferential edge of a hole formed at a support base so that it is positioned over the hole, the positive electrode material 71 was pressed downward using the round bar having an outer diameter smaller than that of the hole. A maximum stress value (maximum stress) generated at the positive electrode material 71 when the positive electrode material 71 was broken was measured. The positive electrode material 71 had an outer diameter of 15 mm and the hole had an outer diameter of 16 mm, and the outer diameter of the round bar was 9.8 mm. The positive electrode material 71 had a thickness of 1.75 mm. The positive electrode material 71 was obtained by mixing manganese dioxide with graphite, tetrafluoroethylene-hexafluoropropylene copolymer, and hydroxypropyl cellulose to prepare a positive electrode active material and pressing the prepared positive electrode mixture in the positive electrode ring 44, followed by baking at 250° C. for 12 hours.

Three kinds of materials used as the positive electrode material 71 in the experiment were a positive electrode material made only of a positive electrode mixture (no mesh member), a positive electrode material provided with a mesh member 81 at one end (with a mesh member), and a positive electrode material provided with a mesh member 81 at both ends (mesh members on both ends). The mesh member 81 each provided in the positive electrode material 71 had an outer diameter approximately equal to 96% of the outer diameter of the positive electrode material 41 (compact).

As a result of the experiment performed in the above-described condition, the maximum stress generated when the positive electrode material 71 without the mesh member was broken was about 130 kPa and the maximum stress generated when the positive electrode material 71 was broken with the mesh member about 240 kPa. As can be understood from this result, the positive electrode material 71 having the mesh member had twice the strength of the positive electrode material 71 having no mesh member. The maximum stress generated when the positive electrode material 71 with the mesh members at both ends was broken was about 300 kPa As can be understood from this result, the positive electrode material 71 can have even greater strength when the mesh members are provided at both ends.

The breaking load (load acting on the positive electrode material 71 when the positive electrode material 71 was broken) was also measured while the density of the material was changed using the round bar similarly to the case of measuring the maximum stress as described above. A positive electrode material 71 provided with a mesh member 81 inside (with a mesh member) and a positive electrode material 71 made only of a positive electrode mixture (no mesh member) were prepared. The density of the positive electrode material 71 with the mesh member was changed by changing the outer diameter of the mesh member 81.

Figure 6:
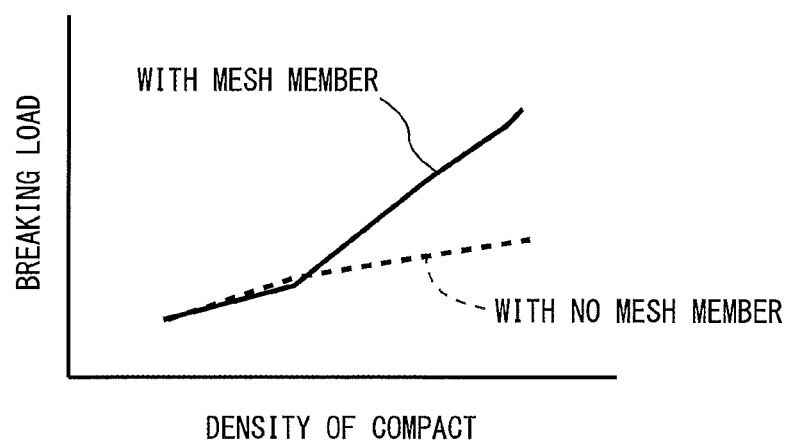
FIG. 6 is a graph showing a relation between the density of a compact made of a positive electrode material and a positive electrode ring and breaking loads.

FIG. 6 shows how the breaking load changed as the density of the positive electrode material 71 (compact) was changed. As can be understood from FIG. 6, the breaking load increases as the density of the compact increases. The breaking load is greater in the case with the mesh member than the case without the mesh member. This tendency is more noticeable as the outer diameter of the compact increases, in other words, as the outer diameter of the mesh member 81 increases. Therefore, the outer diameter of the mesh member 81 preferably has the largest possible size that can be provided in the positive electrode material 71. In FIG. 6, the breaking load was substantially the same for the cases with and without the mesh member when the outer diameter of the mesh member is smaller than the outer diameter of the round bar.

Method of Producing Flat Battery

Now, a method of producing the flat battery 200 having the above-described structure will be described.

A positive electrode can 10 and a negative electrode can 20 that are both cylindrical and have a closed bottom are formed by pressing. A positive electrode material 71 and a negative electrode material 42 are formed. The positive electrode material 71 is obtained by mixing manganese dioxide with graphite, tetrafluoroethylene-hexafluoropropylene copolymer, and hydroxypropyl cellulose to obtain a positive electrode mixture in a powder form and filling a press-formed positive electrode ring 44 with the positive electrode mixture powder, followed by pressing and then baking. When the positive electrode mixture powder is filled within the positive electrode ring 44, the mesh member 81 is provided in the positive electrode ring 44 sometime in the process and the positive electrode mixture powder is further filled thereon. In this way, the positive electrode ring 44 is buried inside the positive electrode material 71. The negative electrode material 42 is obtained by forming metallic lithium or a lithium alloy to have a disk shape.

The positive electrode ring 44 that holds the substantially cylindrical positive electrode material 71 is provided inward of the positive electrode can 10 and the separator 43 and the negative electrode material 42 are placed on the positive electrode material 71 in the mentioned order. On the other hand, the gasket 30 is mounted to a circumferential wall 22 of the negative electrode can 20.

The negative electrode can 20 mounted with the gasket 30 is provided to the positive electrode can 10 that stores the positive electrode ring 44, the separator 43, and the negative electrode material 42 therein to cover the opening of the positive electrode can 10. The negative electrode can 20 is assembled to the positive electrode can 10 so that the circumferential wall 22 is positioned inward of the positive electrode can 10. As the positive electrode can 10 and the negative electrode can 20 are assembled, the open end side of the circumferential wall 12 of the positive electrode can 10 is caulked to the circumferential wall 22 of the negative electrode can 20.

In this way, the flat battery 200 as shown in FIG. 5 is obtained.

Advantages of Third Embodiment

In the above-described structure, the substantially cylindrical positive electrode material 71 has its side surface held by the positive electrode ring 44. In this way, the side surface of the positive electrode material 71 can have improved strength. The positive electrode material 71 is provided with the mesh member 81 at an end of the positive electrode can 10 in the tube axis direction. In this way, the strength of the positive electrode material 71 in the tube axis direction can be improved. Therefore, the positive electrode ring 44 and the mesh member 81 can improve the vibration resistance and shock resistance of the positive electrode material 71. As a result, internal short-circuiting caused by a part of the positive electrode material 71 coming off by vibrations or the like can be more surely prevented.

The mesh member 81 is provided at one of the ends of the positive electrode material 71 in the tube axis direction that is positioned closer to the bottom 11 of the positive electrode can 10. Therefore, the strength of the end of the positive electrode material 71 can be improved and the deformation of the end can be restrained. As a result, the positive electrode material 71 and the bottom 11 of the positive electrode can 10 can be more surely contacted.

The mesh member 81 is buried in the positive electrode material 71 and therefore the positive electrode mixture powder enters spaces of the mesh member 81 when the positive electrode material 71 is formed, so that the mesh member 81 and the positive electrode mixture can be more securely integrated. In this way, the strength of the positive electrode material 71 can be more surely improved.

Other Embodiments

Although the embodiments of the present invention have been described and illustrated, the above-described embodiments are examples for carrying out the invention. Therefore, the present invention is not limited to the described embodiments and modifications of the embodiments may be carried out without departing the scope and spirit of the present invention.

According to the first embodiment described above, the flange 44b of the positive electrode ring 44 has such a size that its outer circumferential end is positioned outward of the open end of the outspread portion 22b of the negative electrode can 20 when viewed in the tube axis direction of the positive electrode can 10. However, the flange 44b of the positive electrode ring 44 may have such a size that its outer circumferential end is positioned outward of the inner circumferential surface of the outspread portion 22b of the negative electrode can 20 when viewed in the tube axis direction of the positive electrode can 10.

According to the above-described embodiments, the flanges 44b and 60b of the positive electrode rings 44 and 60 are formed entirely around the outer circumferences of the side walls 44a and 60a, respectively in an annular manner.

However, the flanges may be provided only partly around the side walls 44*a* and 60*a*. In the arrangement shown in FIG. 3, however, a flange must be provided in opposing positions across the side wall 44*a*. The flange may have a shape other than the annular shape. Similarly, the side walls 44*a* and 60*a* may have a shape other than the cylindrical shape.

According to the above-described embodiments, the circumferential walls 22 and 51 of the negative electrode cans 20 and 50 are formed to have a substantially cylindrical shape so that the end surface on the open end is positioned opposite to the bottom 11 of the positive electrode can 10. However, the circumferential wall of the negative electrode can may have its open end bent and the gasket 30 may be placed between the bent part and the bottom 11 of the positive electrode can 10.

According to the above-described embodiments, the positive electrode can 10 is an exterior can and the negative electrode can 20 is a sealing can but they may be reversed. In the latter case, the arrangement of the positive electrode material and the negative electrode material is reversed, so that a negative electrode ring that holds the negative electrode material is fixed to the negative electrode can as an exterior can.

According to the above-described embodiments, the positive electrode materials 41 and 71 each have a substantially cylindrical shape. However, the positive electrode materials 41 and 71 may have any other shape such as a quadratic prism shape provided that it is a columnar shape.

According to the above-described third embodiment, the mesh member 81 is provided at the end of the positive electrode material 71 in the tube axis direction. However, the mesh member 81 may be provided in or at any part of a surface of the positive electrode material 71 that is not covered with the positive electrode ring 44. For example, the mesh member 81 may be provided at a center part of the positive electrode material 71 in the tube axis direction. A part of the mesh member 81 may be provided at a part of the positive electrode material 71 covered with the positive electrode ring 44. Furthermore, according to the third embodiment, the mesh member 81 is provided to cross the tube axis direction in the positive electrode material 71 but the mesh member 81 may be provided in any other arrangement that can reinforce the positive electrode material 71.

According to the above-described third embodiment, one of the ends of the positive electrode material 71 in the tube axis direction where the mesh member 81 is provided is positioned closer to the bottom 11 of the positive electrode can 10. However, the positive electrode material 71 may be provided so that the other end of the positive electrode material 71 in the tube axis direction where the mesh member 81 is not positioned may be positioned closer to the bottom 11 of the positive electrode can 10.

INDUSTRIAL APPLICABILITY

The flat battery according to the disclosure is applicable as a battery for a device used in an environment subject to shocks.

What is claimed is:
1. A flat battery, comprising:
a tubular exterior can including a tubular side wall, a first bottom and a first open end, the tubular side wall extending in a tube axis direction;
a sealing can including a circumferential wall, a second bottom and a second open end, the circumferential wall positioned inside the tubular side wall while the second bottom closing the first open end;
a positive electrode material and a negative electrode material provided in a space formed between said exterior can and said sealing can; and
a positive electrode ring used to fix said positive electrode material to said exterior can,
said positive electrode ring having a cylindrical holder and a flange, the cylindrical holder having a first end and a second end, the cylindrical holder extending in said tube axis direction such that the first end is opposite to the second end in the tube axis direction, the cylindrical holder holding said positive electrode material thereinside, the flange extending outward from the second end of said holder such that the flange overlaps with the second open end of the circumferential wall of said sealing can when viewed in said tube axis direction,
said flange being placed between the second open end of said circumferential wall of said sealing can and an inner surface of the first bottom of said exterior can,
said negative electrode material being formed using lithium or a lithium alloy.

2. The flat battery according to claim 1, wherein the inner surface of the bottom of said exterior can is flat.

3. The flat battery according to claim 1, wherein said flange is formed to have such a size that said flange overlaps a part of the second open end of the circumferential wall of said sealing can that projects most in said tube axis direction when viewed in said tube axis direction.

4. The flat battery according to claim 1, wherein said flange is formed to have such a size that an outer circumferential end of the flange is positioned outward of the second open end of the circumferential wall of said sealing can when viewed in said tube axis direction.

5. The flat battery according to claim 1, wherein said flange is formed to have such a size that an outer circumferential end of the flange is positioned inward of an outermost circumference of the inner surface of the bottom of said exterior can.

6. The flat battery according to claim 1, wherein said flange is formed at an entire outer circumference of the second end to surround said holder.

7. The flat battery according to claim 1, wherein said flange has a first outermost circumference part and a second outermost circumference part, the first outermost circumference part opposed to the second outermost circumference part about said holder,
wherein the flange has such a size that when the first outermost circumference part is positioned at an outermost circumference of the inner surface of the bottom of said exterior can as viewed in said tube axis direction, the second outermost circumference part overlaps the second open end of the circumferential wall of said sealing can.

8. The flat battery according to claim 1, further comprising a seal member provided between the second open end of the circumferential wall of said sealing can and the inner surface of the bottom of said exterior can,
wherein said flange is placed between said seal member and the inner surface of the bottom of said exterior can.

9. The flat battery according to claim 1, further comprising a reinforcing member provided at a part of said positive electrode material that is not covered with said base to reinforce said part.

10. The flat battery according to claim 9, wherein said positive electrode material is formed to have a columnar shape that extends in said tube axis direction, said positive electrode ring is provided to cover a side surface of said positive electrode material, and
said reinforcing member is provided at an end surface of said positive electrode material in said tube axis direction.

11. The flat battery according to claim 10, wherein said reinforcing member is provided in said positive electrode material to extend in a direction that crosses said tube axis direction.

12. The flat battery according to claim 10, wherein said positive electrode material is provided so that said end surface is positioned on said exterior can.

13. The flat battery according to claim 9, wherein said reinforcing member is a mesh member.

14. The flat battery according to claim 1, wherein the positive electrode ring is positioned inside the flat battery such that the first end is closer to the second bottom than the second end.

* * * * *